(12) United States Patent
Arora et al.

(10) Patent No.: US 8,359,336 B2
(45) Date of Patent: Jan. 22, 2013

(54) INTERPRETING REMOTE OBJECTS AT A LOCAL SITE

(75) Inventors: Geeta Arora, Union City, CA (US); Magdi Morsi, Redmond, WA (US); Rajendra S. Pingte, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2328 days.

(21) Appl. No.: 10/949,102

(22) Filed: Sep. 24, 2004

(65) Prior Publication Data

US 2005/0262113 A1 Nov. 24, 2005

Related U.S. Application Data

(60) Provisional application No. 60/571,072, filed on May 14, 2004.

(51) Int. Cl.
*G06F 7/00* (2006.01)

(52) U.S. Cl. .......................................... 707/802; 707/803

(58) Field of Classification Search ........................ None
See application file for complete search history.

(56) References Cited

U.S. PATENT DOCUMENTS

| | | | | |
|---|---|---|---|---|
| 5,201,046 A | * | 4/1993 | Goldberg et al. | 707/100 |
| 5,315,709 A | * | 5/1994 | Alston et al. | 707/6 |
| 6,356,901 B1 | * | 3/2002 | MacLeod et al. | 707/6 |
| 6,381,600 B1 | * | 4/2002 | Lau | 707/6 |
| 2003/0204510 A1 | * | 10/2003 | Ball et al. | 707/100 |
| 2004/0255301 A1 | * | 12/2004 | Turski et al. | 719/316 |

* cited by examiner

*Primary Examiner* — Fred I Ehichioya
*Assistant Examiner* — Hasanul Mobin
(74) *Attorney, Agent, or Firm* — Hickman Palermo Truong Becker Bingham Wong LLP

(57) ABSTRACT

A method and apparatus for receiving objects is provided. Embodiments provide for receiving, from a source database server, at a target database server, an object. If the object type of the object is involved in an inheritance hierarchy, then the target database server inspects the object to determine a source identifier that identifies to a source database server the object type associated with the object. The target database determines a target identifier that identifies to the target database server the object type associated with the object based on a mapping that associates source identifiers to target identifiers. Alternately, if the object type of the object is not involved in an inheritance hierarchy, then the target database server inspects the object to determine a set of characteristics of the object. The target database server determines the target identifier for the object based on the characteristics of the object.

22 Claims, 4 Drawing Sheets

INTERPRETING REMOTE OBJECTS AT A LOCAL SITE

RELATED APPLICATION AND CLAIM OF PRIORITY

This application claims benefit of U.S. Provisional Application No. 60/571,072, entitled "Interpreting Remote Objects on Local Site," filed on May 14, 2004 by Geeta Arora, et al. This application is related to U.S. patent application Ser. No. 10/144,439, entitled "Schema Evolution of Complex Objects," filed on May 10, 2002 by Rajendra Pingte, et al., the contents both of which are hereby incorporated by reference in their entirety for all purposes.

FIELD OF THE INVENTION

The present invention relates to transferring data from one persistent store to another persistent store.

BACKGROUND

A relational database management system (DBMS) allows entities to be modeled according to the relational paradigm, where entities are modeled in terms of tables with columns and rows. An object-relational DBMS allows entities to be modeled according to the object-oriented paradigm, where entities are modeled as instances of an object type.

An object type is a database construct that defines a data structure (attributes) and the legal operations (methods) on the attributes. A particular instantiation of an object type is referred to as an object. Thus, an object type may be thought of as a template for an object. An object is a logical structure that directly refers to data in a database. An object has the attributes and methods defined for its type. As an object instance is a concrete thing, one may assign values to the attributes of object and may call the methods of an object. Illustrative, non-limiting examples of objects include tables, indexes, views, synonyms, sequences, partitions, clusters, and database links.

One may create a specialized object type by creating subtypes that have some added, differentiating feature, such as an additional attribute or method. One may create a subtype by deriving the subtype from a parent object type, called a supertype. Subtypes and supertypes are related by inheritance, as subtypes are specialized versions of their parent. Subtypes have all the supertype's attributes and methods, plus any specializations that are defined in the subtype itself. Subtypes and supertypes connected by inheritance make up an inheritance hierarchy.

For example, an inheritance hierarchy with PERSON_T and STUDENT_T types may be created in a database by the performance of the following SQL commands:

CREATE TYPE Person_T (SSN NUMBER, name VARCHAR2(30), address VARCHAR2(255)) NOT FINAL;
CREATE TYPE Student_T UNDER Person_T (deptid NUMBER, major VARCHAR2(100));

In the above example, the type PERSON_T is the supertype, and the type STUDENT_T is the subtype.

An object type that is not involved in an inheritance hierarchy is referred to as a basic type. For example, if a particular object type is created on a DBMS, and the object type is neither a supertype nor a subtype, then the object type is a basic type.

A DBMS may assign a unique identifier (referred to in this example as a type object identifier, or a "TOID") to each object type. The TOID-to-object type assignments are made on a per database basis. Thus, the same object type may be associated with one TOID in one database, and with an entirely different TOID in another database.

Each object instantiated from a particular object type has the same TOID as the object type from which the object is instantiated. A DBMS uses the TOID associated with an object to determine which object type is associated with the object, thus allowing the DBMS to properly interpret the object. Because the TOID-to-object type assignments are made on a per database basis, a TOID is only meaningful to the DBMS in which it was assigned.

An object may be transferred from one DBMS (e.g., a source DBMS) to another DBMS (e.g., a target DBMS). When an object is transferred from a source DBMS to a target DBMS, the target DBMS needs to determine how to interpret the object. However, the TOID associated with the object was created in the source DBMS, not the target DBMS. Consequently, the target DBMS does not know how to interpret the TOID associated with the object as the TOID is not valid at the target DBMS.

According to one approach, when information describing an object is transferred from a source DBMS to a target DBMS, an object is manually created at the target DBMS. The TOID associated with the manually created object reflects a TOID assigned by the target DBMS. Consequently, the TOID is valid at the target DBMS and that identifies the proper object type. However, this is undesirable because it requires manual user intervention. Consequently, a new approach in transferring objects from a source DBMS to a target DBMS that overcomes the limitations of prior approaches is required.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Embodiments provide for receiving, from a source database server, at a target database server, an object. If the object type of the object is involved in an inheritance hierarchy (e.g., the object type of the object is a subtype or a supertype), then the target database server inspects the object to determine a source identifier. The source identifier identifies, to the source database server, the object type associated with the object. The target database determines a target identifier that identifies, to the target database server, the object type associated with the object based on a mapping that associates source identifiers to target identifiers.

On the other hand, if the object type of the object is not involved in an inheritance hierarchy, then the target database server inspects the object to determine a set of characteristics of the object. For example, the target database server may determine the name of the object, the attributes of the object, and the order of the attributes of the object. The target database server determines the target identifier for the object based on the characteristics of the object.

Embodiments allow objects to be imported into a target DBMS without manual intervention from the user. Further, the target DBMS may assign a unique identifier (e.g., a TOID), that identifies the object type of the object to the target DBMS, to the imported object regardless of whether or not the object is involved in an inheritance hierarchy. Embodiments thus allow users to perform a "fileless export import," explained in further detail below. Further, embodiments enable users to create a local snapshot of a remote table by creating a local table, and thereafter populating the table using data from the remote table.

Architecture Overview

Figure 1:
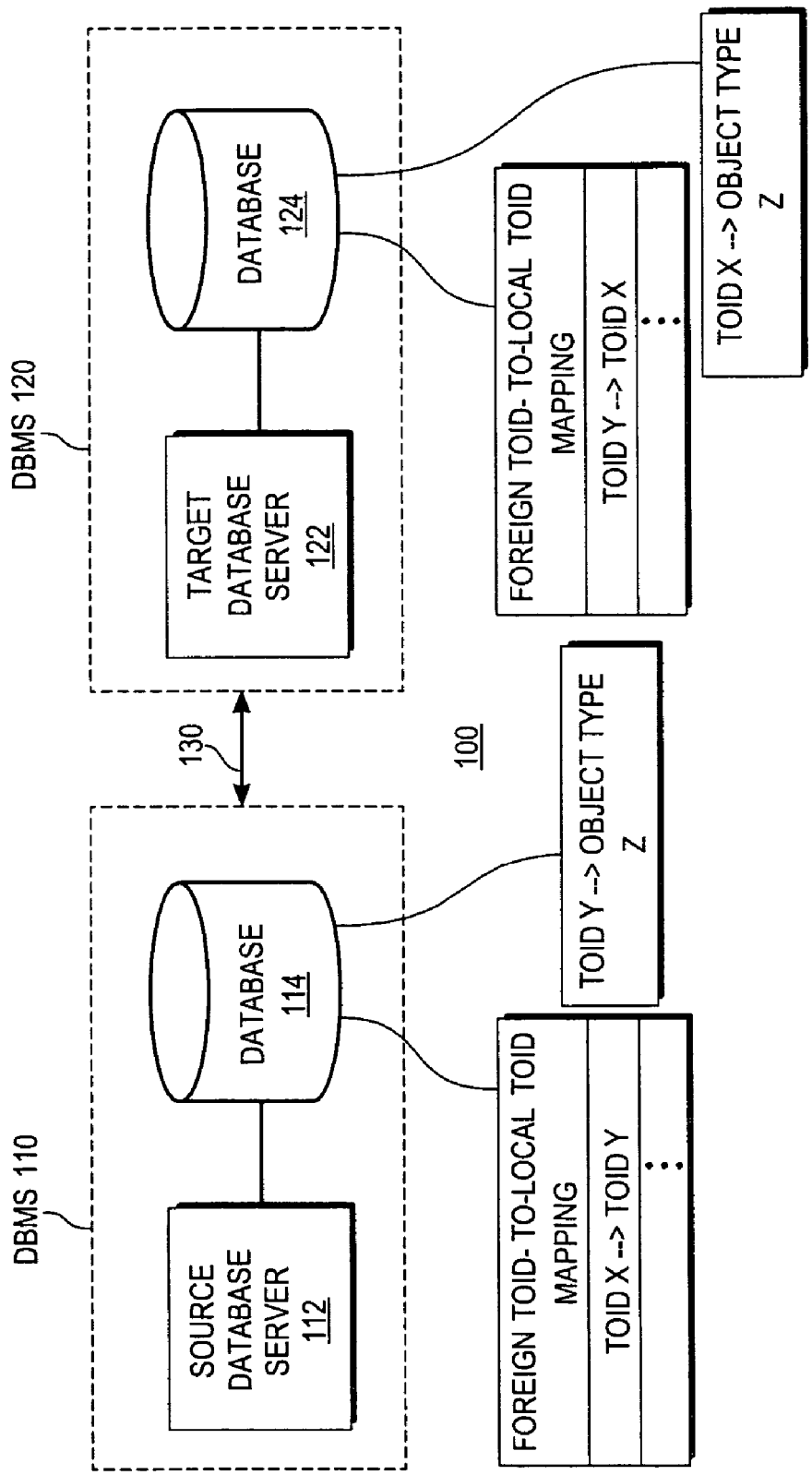
FIG. 1 is a block diagram of a system according to an embodiment.

FIG. 1 is a block diagram of a system 100 according to an embodiment. System 100 includes a first database management system ("DBMS") 110, a second DBMS 120, and a communications link 130.

DBMS 110 and 120 each comprise a database server and a database. A database server, such as database server 112 and 122, refer to any functional component that is capable of servicing requests to retrieve or store data in a database. For ease of explanation, database 112 has been labeled source database server 112, and database 122 has been labeled target database server 122, as an illustrative example shall be discussed below wherein an object is transferred from DBMS 110 to DBMS 120.

A database, such as database 122 and 124, refer to any persistent storage capable of persistently storing data. Illustrative, non-limiting examples of a database include a relational database, an object-oriented database, and a multidimensional database.

Communications link 130 may be implemented by any medium or mechanism that provides for the exchange of data between DBMS 110 and DBMS 120. Examples of communications link 130 include, without limitation, a network such as a Local Area Network (LAN), Wide Area Network (WAN), Ethernet or the Internet, an inter process communication, or one or more terrestrial, satellite or wireless links.

While each of the components discussed above is depicted separately in FIG. 1, one or more of the above functional components may be implemented on the same computer system. For example, source database server 112 and database 114 may be implemented on the same machine in an embodiment.

Figure 2:
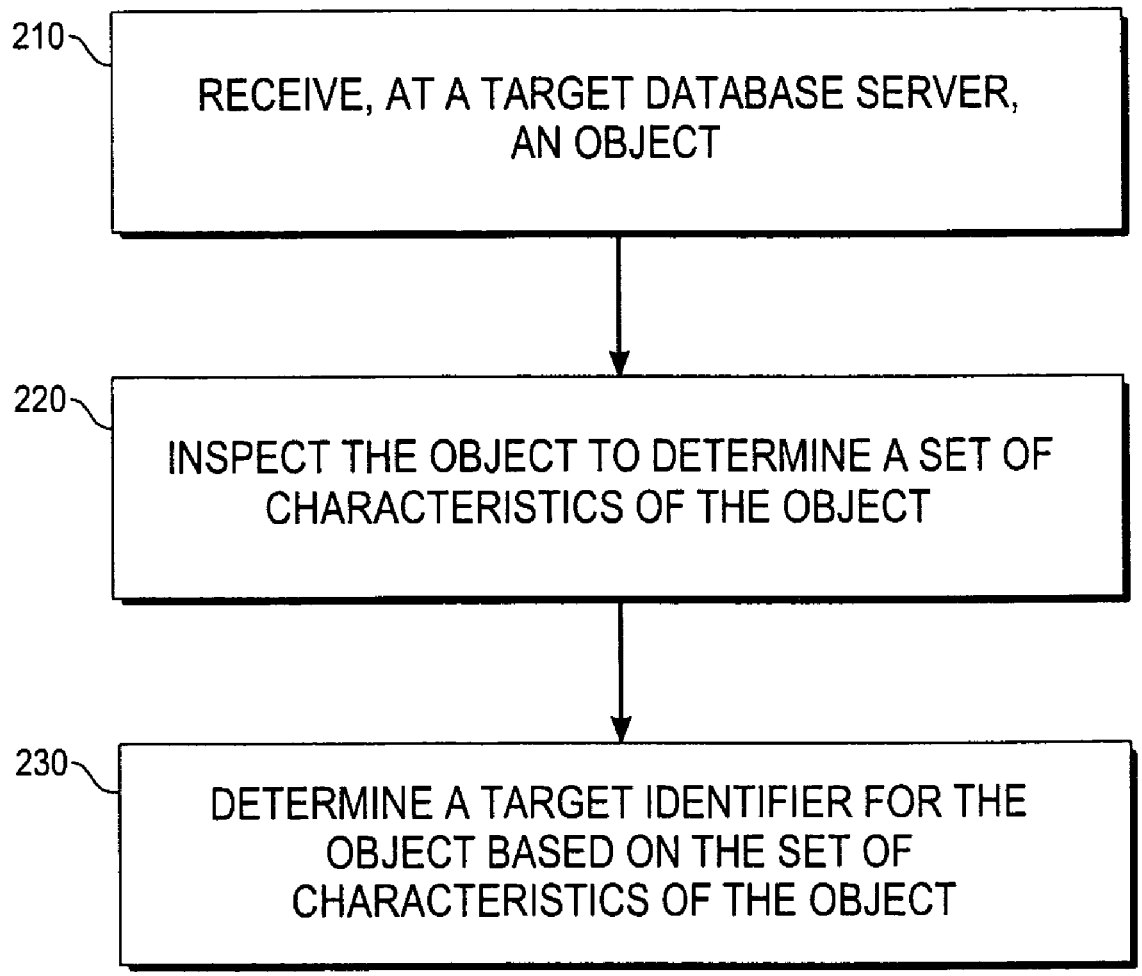
FIG. 2 is a flowchart of the operation of a system according to a first embodiment.

Receiving Objects Having an Object Type not Involved in an Inheritance Hierarchy FIG. 2 is a flowchart of the operation of a system according to a first embodiment. By performing the steps of FIG. 2, a system may receive and interpret, at a target database from a source database, an object that has an object type that is not involved in an inheritance hierarchy. The steps of FIG. 2 shall be described with reference to transferring an object from DBMS 110 to DBMS 120. Consequently, database server 112 shall be referred to as source database server 112 and database server 122 shall be referred to as target database server 122.

In step 210, an object is received at target database server 122 from source database server 112. The object received in step 210 has an object type that is not involved in an inheritance hierarchy. For example, the object type of the object received in step 210 is not involved in an inheritance hierarchy, but rather is a basic type. In an embodiment, target database server 122 determines that the object received in step 210 is not involved in an inheritance hierarchy because the object does not contain a reference to a source identifier (e.g., a TOID) that identifies to the source database server 112 the object type associated with the object.

For example, the object of step 210 may be received by receipt of the SQL statement of Example 1 or Example 2:

Example 1

INSERT INTO target_table SELECT * FROM source_table@dblink;

Example 2

INSERT INTO target_object_table SELECT VALUE(t) FROM source_object_table@dblink t;

The SQL statement of Example 1 may be used to transfer columns of all datatypes, including, for example, User Defined Types (UDTs), non-final types (a object type that is defined with a "not final" keyword, thereby allowing the non-final type to have subtypes), subtypes, XMLType, ANYDATA, LOBs, VARRAYS, nested tables, and any valid combination thereof, from DBMS 110 to the target database server 122. The SQL statement of Example 2 may be used to transfer object tables from DBMS 110 to the target database server 122.

The object received in step 210 may be expressed as an image. An image is a linearized form of an object that is used in transferring an object from one database (e.g., DBMS 110) to another database (e.g., DBMS 120). Further information about the structure and use of an image is provided in U.S. patent application Ser. No. 10/144,439, entitled "Schema Evolution of Complex Objects," filed on May 10, 2002 by Rajendra Pingte et al. After the performance of step 210, processing proceeds to step 220.

In step 220, the object received in step 210 is inspected to determine a set of characteristics of the object. In an embodiment, target database server 122 may perform step 220. The set of characteristics that are determined in step 220 identify to target database server 122 the object type associated with the object received in step 210.

For example, the set of characteristics that are determined in step 220 may include the name of the object, the attributes of the object, and the order of the attributes of the object. An object type defined in DBMS 110 has the same name, attributes, and order of the attributes, as the same object type defined in DBMS 120. Consequently, object types have the same name, attributes, and order of attributes in DBMS 110 and DBMS 120. Other embodiments may employ a different set of characteristics to determine the object type of an imported object. The ability of the set of characteristics to identify a particular object type on a DBMS is more important than the actual composition of the set of characteristics that are used to identify object types.

When a new object type is created in a DBMS, the object type must be created such that the newly created object type has the same set of characteristics, or is otherwise, structurally equivalent, across each DBMS in which the same object type has already been defined. For example, if a new object type FOO, previously created in DBMS 110, is created in DBMS 120, then the object type FOO defined in DBMS 120 must have the same set of characteristics as the object type FOO defined in DBMS 110. After the performance of step 220, processing proceeds to step 230.

In step 230, a target identifier for the object is determined based on the set of characteristics of the object that are determined in step 220. In an embodiment, target database server 122 determines the target identifier in step 230. The target identifier identifies, to the target database server 122, the object type associated with the object received in step 210.

The target database server 122 may determine what type of object type is associated with the object because the name of the object type, the attributes of the object, and the order of the attributes. For example, if target database server 122 determines that the object received in step 210 has the set of characteristics of the FOO object type, then the target database server 122 determines that the object is of object type FOO.

The target database server 122 determines the target identifier for the object received in step 210 based on the object type of the object. Once the target database server 122 determines the target identifier for the object received in step 210, the target database server 122 assigns the target identifier to the object, e.g., an attribute of the object may be assigned the value of the target identifier or a particular method may be called on the object using the target identifier as an argument.

Once the target database server 122 determines the target identifier for the object received in step 210, target database server 122 stores the object in database 124.

Figure 3:
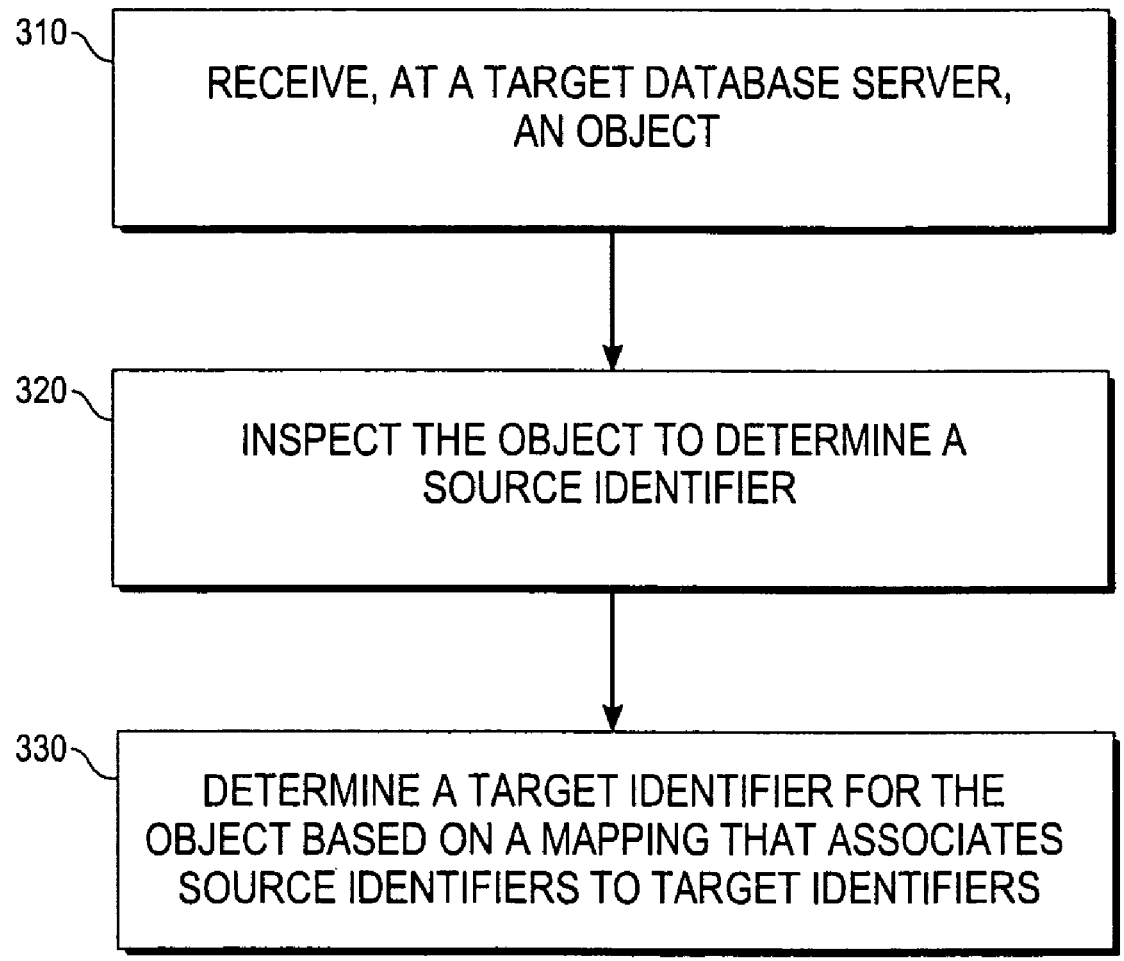
FIG. 3 is a flowchart of the operation of a system according to a second embodiment.

Receiving Objects Having an Object Type Involved in an Inheritance Hierarchy FIG. 3 is a flowchart of the operation of a system according to an embodiment. By performing the steps of FIG. 3, a system may receive and interpret, at a target database from a source database, an object that has an object type that is involved in an inheritance hierarchy. The steps of FIG. 3 shall be described with reference to transferring an object from DBMS 110 to DBMS 120. Consequently, database server 112 shall be referred to as source database server 112 and database server 122 shall be referred to as target database server 122. As the received object is involved in an inheritance hierarchy, the received object must contain a reference to the source identifier (such as a TOID valid at the source database server 112). Otherwise the target database server 122 would not be able to determine which subtype, of the received object's supertype, is associated with the received object.

In step 310, an object is received at target database server 122 from source database server 112. The performance of step 310 is similar to the performance of step 210, except that the object received in step 310 has an object type that is involved in an inheritance hierarchy, e.g., the object type of the object received in step 310 may be a subtype or a supertype. After the performance of step 310, processing proceeds to step 320.

In step 320, the object received in step 310 is inspected to determine a source identifier. The source identifier identifies to source database server 112 the object type associated with the object received in step 310. For example, the source identifier may be a TOID recognizable to DBMS 110. After the performance of step 320, processing proceeds to step 330.

In step 330, a target identifier for the object received in step 310 is determined based on a mapping that associates source identifiers to target identifiers. In an embodiment, the mapping may be implemented using a hash table, wherein the keys to the hash table are the source identifiers, and the output of the hash table is the target identifier. In another embodiment, the mapping may be implemented using a lookup table.

The mapping may be created prior to receiving the object of step 310. For example, each DBMS may contain a mapping of object type identifiers used by other DBMSs to object type identifies used by the DBMS. When a new object type is created on the DBMS 120, the mapping is updated to reflect the new object type. The mapping may reflect the new object type by, for example, insuring that an input to the mapping corresponds to the source identifier for the object type, and the output of the mapping corresponds to the target identifier for the object type on the target DBMS. The mapping allows the DBMS containing the mapping to process an incoming object to determine the object's object type.

For example, FIG. 1 illustrates a mapping for DBMS 110 and DBMS 120. Assume that a new object type Z is created on both DBMS 110 and DBMS 120. The mapping at DBMS 110 and the mapping stored at DBMS 120 are updated to reflect the new object type Z. Specifically, information is stored, in database 114, that associates object type Z with a TOID that was assigned to object type Z by DBMS 110 (here, TOID Y). Similarly, information is stored, in database 124, that associates object type Z with a TOID that was assigned to object type Z by DBMS 120 (here, TOID X). Further, information is stored in both database 114 and database 124 that associates the TOID that was assigned to object type Z by DBMS 110 with the TOID that was assigned to object type Z by DBMS 120.

In the embodiment depicted in FIG. 1, both DBMS 110 and DBMS 120 store (a) a mapping between foreign TOIDs and local TOIDs, and (b) information that associates TOIDs locally assigned to object types, thereby allowing both DBMS 110 and DBMS 120 to process incoming objects that are transferred in from other DBMSs. While the embodiment depicted in FIG. 1 shows both DBMS 110 and DBMS 120 storing (a) a mapping between foreign TOIDs and local TOIDs, and (b) information that associates TOIDs locally assigned to object types, other embodiments may be implemented wherein only the DBMS that receives the transferred object contains (a) a mapping between foreign TOIDs and local TOIDs, and (b) information that associates TOIDs locally assigned to object types.

After the target identifier for the object received in step 310 is determined, target database server 122 may replace the source identifier associated with the object with the target identifier. Once the target database server 122 replaces the source identifier associated with the object with the target identifier, target database server 122 may store the object in database 124.

Advantageously, embodiments performing the steps of either FIG. 2 or FIG. 3 support the transfer of User Defined Types (UDTs) objects from a source DBMS to a target DBMS. Further, embodiments enable users to create a local snapshot of a remote table by creating a local table, and thereafter populating the table using data from the remote table.

Embodiments allow users to perform a "fileless export/import." In a traditional export/import, a user exports data to a file from a source database, and thereafter imports data from the file into a target database. In a "fileless export/import," a utility (e.g., a datapump) may be employed to move data from one database to another without the use of an intermediate file. Thus, embodiments provide for copying data between two databases seamlessly without the need for an application like the export/import utility.

Implementing Mechanisms

Figure 4:
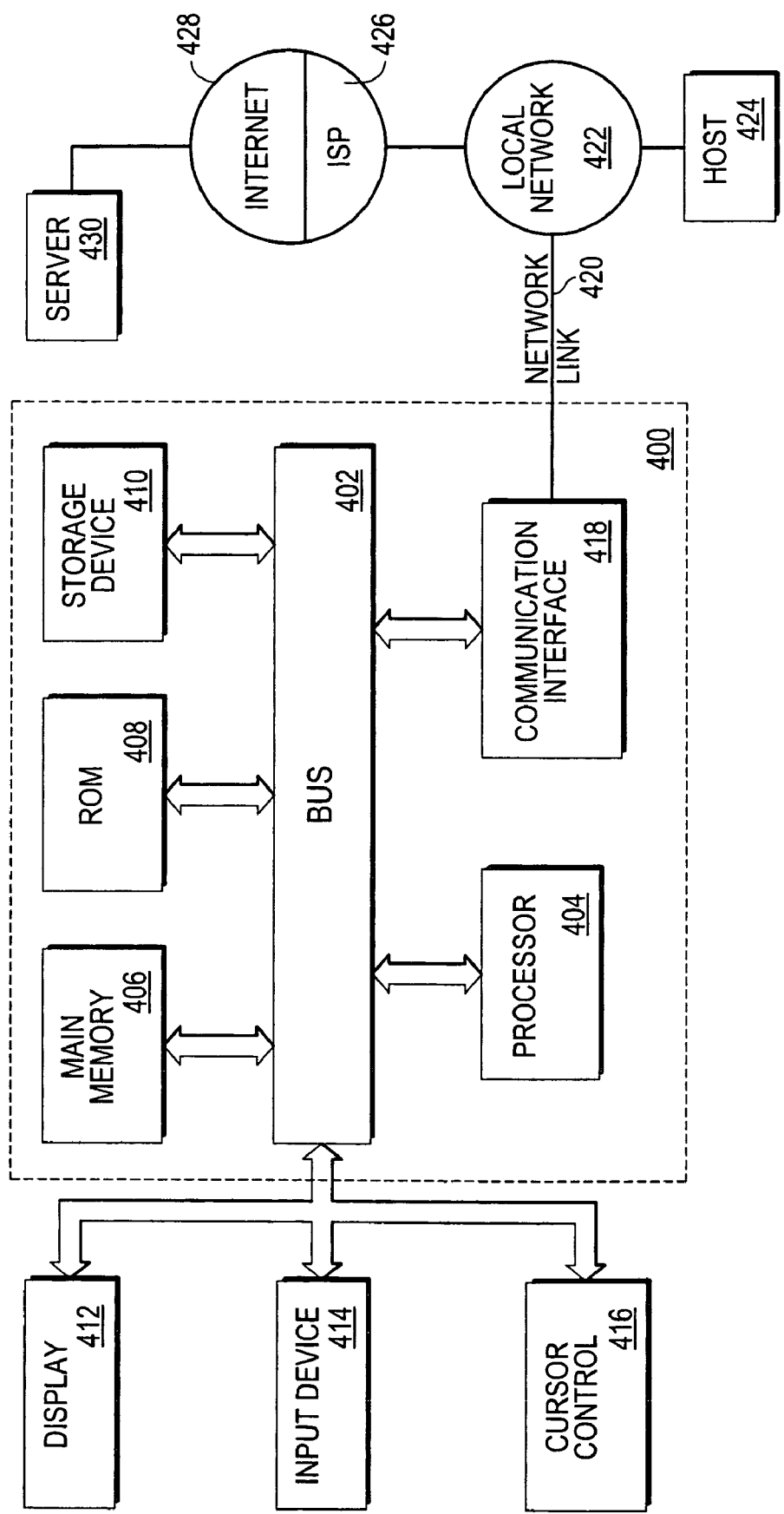
FIG. 4 is a block diagram that illustrates a computer system upon which an embodiment may be implemented.

A database server and a database may each be implemented on a computer system. FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:
   receiving, at a target database server, an object;
   wherein the target database server does not know the object type associated with the object;
   wherein the object is not associated with an identifier that identifies, to the target database server, the object type associated with the object;
   wherein the target database server is unable, without knowing the object type associated with the object, to properly interpret the object;
   inspecting, at the target database server, the object to determine a set of characteristics of the object;
   determining an object type of the object based on the set of characteristics of the object, wherein the object type is a database construct that defines (a) attributes of all instances of the object type and (b) methods of the object type;
   determining a target identifier for the object, wherein the target identifier identifies, to the target database server, the object type associated with the object; and
   using the target identifier, within the target database server, to properly interpret the object.

2. The method of claim 1, wherein the set of characteristics comprises a name of the object, attributes of the object, and an order of the attributes of the object.

3. The method of claim 1, wherein the object is instantiated from a basic type, wherein an object of the basic type is one that is not involved in an inheritance hierarchy.

4. The method of claim 1, further comprising assigning the target identifier to the object.

5. A machine-implemented method, comprising the step of:
   receiving, at a target database server, an object from a source database server;
   inspecting, at the target database server, the object to determine a source identifier, wherein the source identifier identifies to the source database server the object type associated with the object;
   wherein the object type is a database construct that defines (a) attributes of all instances of the object type and (b) methods of the object type;
   determining a target identifier for the object based on a mapping that associates source identifiers to target identifiers,
   wherein the target identifier identifies, to the target database server, the object type associated with the object; and
   using the target identifier, within the target database server, to properly interpret the object.

6. The method of claim 5, wherein the mapping is implemented using a hash table.

7. The method of claim 6, wherein the source identifier is a key to the hash table.

8. The method of claim 5, further comprising replacing the source identifier associated with the object with the target identifier.

9. The method of claim 5, wherein the type of the object is a subtype.

10. A non-transitory machine-readable storage medium storing one or more sequences of instructions, wherein the machine-readable medium is one of a volatile medium or a non-volatile medium, wherein execution of the one or more sequences of instructions by one or more processors causes the one or more processors to perform the steps of:
    receiving, at a target database server, an object;
    wherein the target database server does not know the object type associated with the wherein the object is not associated with an identifier that identifies, to the target database server, the object type associated with the object;
    wherein the target database server is unable, without knowing the object type associated with the object, to properly interpret the object;
    inspecting, at the target database server, the object to determine a set of characteristics of the object;
    determining an object type of the object based on the set of characteristics of the object, wherein the object type is a database construct that defines (a) attributes of all instances of the object type and (b) methods of the object type;
    determining a target identifier for the object, wherein the target identifier identifies, to the target database server, the object type associated with the object; and
    using the target identifier, within the target database server, to properly interpret the object.

11. The non-transitory machine-readable storage medium of claim 10, wherein the set of characteristics comprises a name of the object, attributes of the object, and an order of the attributes of the object.

12. The non-transitory machine-readable storage medium of claim 10, wherein the object is instantiated from a basic type, wherein an object of the basic type is one that is not involved in an inheritance hierarchy.

13. The non-transitory machine-readable storage medium of claim 10, wherein execution of the one or more sequences of instructions by the one or more processors causes the one or more processors to perform the step of assigning the target identifier to the object.

14. A non-transitory machine-readable storage medium storing one or more sequences of instructions, wherein the machine-readable medium is one of a volatile medium or a non-volatile medium, wherein execution of the one or more sequences of instructions by one or more processors causes the one or more processors to perform the steps of:
    receiving, at a target database server, an object from a source database server;
    inspecting, at the target database server, the object to determine a source identifier, wherein the source identifier identifies to the source database server the object type associated with the object;
    wherein the object type is a database construct that defines (a) attributes of all instances of the object type and (b) methods of the object type;
    determining a target identifier for the object based on a mapping that associates source identifiers to target identifiers, wherein the target identifier identifies, to the target database server, the object type associated with the object; and using the target identifier, within the target database server, to properly interpret the object.

15. The non-transitory machine-readable storage medium of claim 14, wherein the mapping is implemented using a hash table.

16. The non-transitory machine-readable storage medium of claim 15, wherein the source identifier is a key to the hash table.

17. The non-transitory machine-readable storage medium of claim 14, wherein execution of the one or more sequences of instructions by the one or more processors causes the one or more processors to perform the step of replacing the source identifier associated with the object with the target identifier.

18. The non-transitory machine-readable storage medium of claim 14, wherein the type of the object is a subtype.

19. The method of claim 1, wherein receiving the object includes receiving the object from a source database server without the use of an intermediate file.

20. The method of claim 5, wherein receiving the object from the source database server includes receiving the object from the source database server without the use of an intermediate file.

21. The non-transitory machine-readable storage medium of claim 10, wherein receiving the object includes receiving the object from a source database server without the use of an intermediate file.

22. The non-transitory machine-readable storage medium of claim 14, wherein receiving the object from the source database server includes receiving the object from the source database server without the use of an intermediate file.

* * * * *

UNITED STATES PATENT AND TRADEMARK OFFICE
CERTIFICATE OF CORRECTION

| | | |
|---|---|---|
| PATENT NO. | : 8,359,336 B2 | |
| APPLICATION NO. | : 10/949102 | |
| DATED | : January 22, 2013 | |
| INVENTOR(S) | : Arora et al. | |

It is certified that error appears in the above-identified patent and that said Letters Patent is hereby corrected as shown below:

In column 10, line 19, in Claim 10, after "with the" insert -- object; --.

Signed and Sealed this
Ninth Day of April, 2013

Teresa Stanek Rea
*Acting Director of the United States Patent and Trademark Office*